United States Patent
Murao et al.

(10) Patent No.: US 9,800,881 B2
(45) Date of Patent: Oct. 24, 2017

(54) IMAGE PROCESSING APPARATUS AND IMAGE PROCESSING METHOD

(71) Applicant: DENSO CORPORATION, Kariya, Aichi-pref. (JP)

(72) Inventors: Toshikazu Murao, Kariya (JP); Takayuki Kimura, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 158 days.

(21) Appl. No.: 14/889,789

(22) PCT Filed: Apr. 30, 2014

(86) PCT No.: PCT/JP2014/061987
§ 371 (c)(1),
(2) Date: Nov. 6, 2015

(87) PCT Pub. No.: WO2014/181743
PCT Pub. Date: Nov. 13, 2014

(65) Prior Publication Data
US 2016/0105679 A1    Apr. 14, 2016

(30) Foreign Application Priority Data

May 7, 2013   (JP) .................................. 2013-097664

(51) Int. Cl.
*H04N 5/225* (2006.01)
*H04N 5/765* (2006.01)
(Continued)

(52) U.S. Cl.
CPC ....... *H04N 19/426* (2014.11); *G06K 9/00624* (2013.01); *G06T 5/009* (2013.01);
(Continued)

(58) Field of Classification Search
CPC .... H04N 19/426; H04N 5/2351; H04N 5/243; H04N 5/23293; G06T 5/009; G06T 2207/30252; G06K 9/00624
(Continued)

(56) References Cited

U.S. PATENT DOCUMENTS

2005/0226526 A1   10/2005  Mitsunaga
2006/0187314 A1    8/2006  Fujie et al.
(Continued)

FOREIGN PATENT DOCUMENTS

JP    2000-115534 A    4/2000
JP    2001-086365 A    3/2001
(Continued)

OTHER PUBLICATIONS

International Search Report (translated version); International Application No. PCT/JP2014/061987, filed Apr. 30, 2014; 11 pages.
(Continued)

*Primary Examiner* — Robert Chevalier
(74) *Attorney, Agent, or Firm* — Knobbe, Martens, Olson & Bear, LLP

(57) ABSTRACT

In imaging processing, image data outputted from an imaging device is acquired as a data string formed of a first display value expressed by a first number of gradations obtained through conversion of a luminance value in accordance with preset nonlinear conversion characteristics. The first display value is compressed in accordance with preset compression characteristics, and outputted as a second display value expressed by a second number of gradations smaller than the first number of gradations. A recognition target is detected from an image expressed by compressed data that is a data string formed of the second display value. A ratio of the second number of gradations to the first number of gradations is taken as a basic compression ratio, a luminance range including at least a recognition target range that is a luminance range where the recognition target is estimated to be present is taken as a specified range, and the first display value corresponding to a boundary luminance value that is a minimum luminance value in the specified range is taken as a boundary first display value. In
(Continued)

the recognition target range, the compression characteristics are set so that the second display value is a sum of a compressed value and the boundary first display value, the compressed value being obtained by compressing a value of not less than the boundary first display value among the first display values at a low compression ratio lower than the basic compression ratio.

3 Claims, 11 Drawing Sheets

(51) Int. Cl.
 H04N 19/426 (2014.01)
 G06T 5/00 (2006.01)
 H04N 5/235 (2006.01)
 H04N 5/243 (2006.01)
 G06K 9/00 (2006.01)
 H04N 5/232 (2006.01)

(52) U.S. Cl.
 CPC ....... *H04N 5/2351* (2013.01); *H04N 5/23293* (2013.01); *H04N 5/243* (2013.01); *G06T 2207/30252* (2013.01)

(58) Field of Classification Search
 USPC ........ 348/169; 386/230, 232, 300, 307, 311, 386/313, 326, 328
 See application file for complete search history.

(56) References Cited

U.S. PATENT DOCUMENTS

| 2007/0040914 | A1 | 2/2007 | Katagiri et al. |
| 2008/0259181 | A1 | 10/2008 | Yamashita et al. |
| 2009/0051794 | A1 | 2/2009 | Ando |
| 2009/0141139 | A1 | 6/2009 | Takahashi et al. |
| 2010/0231749 | A1* | 9/2010 | Tatsuzawa ............. H04N 5/235 348/229.1 |
| 2013/0208117 | A1 | 8/2013 | Kamon et al. |

FOREIGN PATENT DOCUMENTS

| JP | 2004-221645 A | 8/2004 |
| JP | 2006-237851 A | 9/2006 |
| JP | 2007-082180 A | 3/2007 |
| JP | 2008-289120 A | 11/2008 |
| JP | 2008-305122 A | 12/2008 |
| JP | 2012-208776 A | 10/2012 |
| WO | 2006/098360 A1 | 9/2006 |
| WO | 2006/103881 A1 | 10/2006 |
| WO | 2009/057478 A1 | 5/2009 |
| WO | 2011/155136 A1 | 12/2011 |
| WO | 2014/181743 A1 | 11/2014 |

OTHER PUBLICATIONS

International Preliminary Report on Patentability; International Application No. PCT/JP2014/061987; Filed: Apr. 30, 2014 (with English translation).

* cited by examiner

FIG.6
(a)
(b)

IMAGE PROCESSING APPARATUS AND IMAGE PROCESSING METHOD

CROSS-REFERENCE TO RELATED APPLICATION

This application is based on and claims the benefit of priority from earlier Japanese Patent Application No. 2013-097664 filed on May 7, 2013 the descriptions of which are incorporated herein by reference.

BACKGROUND

Technical Field

The present invention relates to an image processing apparatus and an image processing method which detect a recognition target from an image captured by a camera, such as an on-vehicle camera.

Background Art

Image processing apparatuses are known which detect preset recognition targets from images captured by cameras. Image processing apparatuses with various processing performances are used according to applications. The cameras, owing to their improved performances, are ensured to output image data in a wide dynamic range. Accordingly, the dynamic range (e.g. 12 bits) of image data outputted from such a camera may exceed the processing performance (e.g. 8 bits) of the image processing apparatus. In such a case, some known image processing apparatus performs gray scale conversion (e.g. conversion from 12 to 8 bits) to lower the number of gradations (or the number of steps of a gradation scale) of the image data outputted from the camera, and then detects a recognition target in the gray scale-converted image data. For example, PTL 1 discloses such an example.

CITATION LIST

Patent Literature

PTL 1: JP-A-2012-208776

SUMMARY OF THE INVENTION

There has been a trend in recent years toward usage of cameras having high dynamic range (HDR) characteristics for expanding a dynamic range. The HDR characteristics refer to that, when the characteristics of a camera are expressed as a relationship between luminance and an output pixel value (display value of luminance), the relationship of an output pixel value to luminance is not constant (linear) in all luminance ranges but is different (nonlinear) depending on luminance ranges. In other words, resolution is set finely (hereinafter referred to as a fine resolution range) in some luminance ranges, but in some range different from this, resolution is set more coarsely than in the fine resolution range (hereinafter referred to as a coarse resolution range).

An output pixel value outputted from a camera having such HDR characteristics is often subjected to gray scale conversion to lower the number of gradations as described above. For example, in some cases, the number of gradations is converted from 12 bits to 8 bits. In such a case, when output pixel values are uniformly compressed at a compression ratio of $1/2^4$, the resolution of the coarse resolution range is further lowered. In other words, when the luminance of a recognition target is included in the coarse resolution range, the detection accuracy of the recognition target is likely to be impaired.

SUMMARY

Thus it is desired to provide an image processing apparatus that highly accurately detects a recognition target in an image expressed by image data which have been subjected to gray scale conversion to lower the number of gradations.

In an image processing apparatus according to the present disclosure made to achieve the object, an acquiring means acquires image data that is a data array formed of a first display value outputted from an imaging device. The first display value is obtained through conversion of a luminance value expressed by a first number of gradations in accordance with preset nonlinear conversion characteristics. A compressing means compresses the first display value in accordance with preset compression characteristics, and outputs, as a second display value, a value expressed by a second number of gradations smaller than the first number of gradations. A recognizing means detects a recognition target from an image expressed by the compressed data that is a data string formed of the second display value.

Herein, a ratio of the second number of gradations to the first number of gradations is taken as a basic compression ratio, a luminance range including at least a recognition target range that is a luminance range where the recognition target is estimated to be present is taken as a specified range, and the first display value corresponding to a boundary luminance value that is a minimum luminance value in the specified range is taken as a boundary first display value. In the recognition target range, the compression characteristics are set so that the second display value is a sum of a compressed value and the boundary first display value. In this case, the compressed value is obtained by compressing a value of not less than the boundary first display value among the first display values at a lower compression ratio lower than the basic compression ratio.

Nonlinear characteristics referred to in the conversion characteristics include characteristics set as a combination of linear characteristics that are predetermined for each luminance range. The boundary first display value includes zero.

According to the image processing apparatus of the present disclosure, in the case where the first display value is compressed to the second display value (gray scale conversion), lowering of the resolution in a recognition target range is minimized. Accordingly, in an image expressed by the second display value after compression, degradation is minimized in the detection accuracy of a recognition target.

BRIEF DESCRIPTION OF DRAWINGS

In the accompanying drawings:

FIG. 6 shows by (a) an example of an image obtained by uniformly compressing pixel output values at a basic compression ratio, and by (b) an example of an image obtained in accordance with the total conversion characteristics of an image processing apparatus according to the first embodiment;

DESCRIPTION OF EMBODIMENTS

Figure 1:
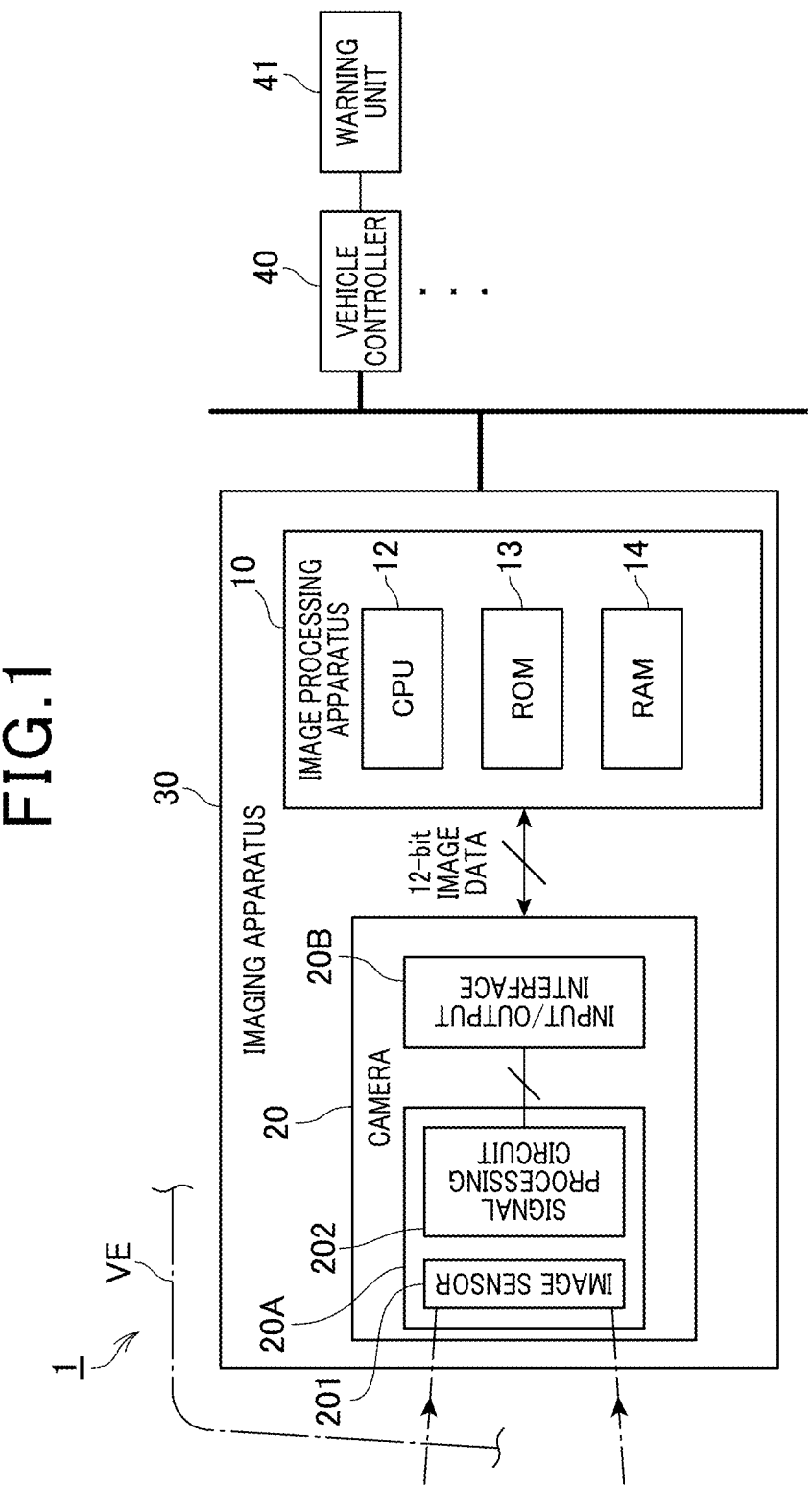
FIG. 1 is a block diagram illustrating a configuration of a driver assistance system according to a first embodiment.

In the following, referring to the drawings, embodiments to which the present invention is adapted will be described.

First Embodiment

An image processing apparatus according to the present embodiment is applied to a driver assistance system installed in a vehicle to detect a recognition target present in the forward area of the vehicle (the own vehicle) and to perform various processes of driver assistance control on the basis of the detected result.

As illustrated in FIG. 1, a driver assistance system 1 includes an on-vehicle camera (in the following, simply referred to as a camera) 20 that captures an image of the forward area of an own vehicle VE and outputs the captured image as 12-bit image data. This camera functions as an imaging means. The driver assistance system 1 includes an image processing apparatus 10 that converts the image data outputted from the camera 20 into eight-bit image data and uses an image expressed by the converted image data for performing image processing suitable for various purposes (applications). For example, the image processing apparatus 10 performs a process that detects a recognition target, such as a preceding vehicle, pedestrian, and white line, and outputs the detected result.

The driver assistance system 1 includes a vehicle controller 40 that determines whether, at least in the present embodiment, the own vehicle VE has a risk of departing from the lane using the detected result of the image processing apparatus 10 and instructs a warning unit 41 to emit an alarm if the vehicle controller 40 determines that there is a risk. In the following, the camera 20 and the image processing apparatus 10 are referred to as an imaging apparatus 30.

The camera 20 is disposed at a predetermined position in the car compartment, on the back of a rearview mirror, for example, and outputs image data expressing the captured image of the forward area of the vehicle VE in the traveling direction. More specifically, the camera 20 includes an imager 20A provided with an imaging device that generates image data expressing a captured image and an input/output interface circuit 20B for the image processing apparatus 10.

The imager 20A includes a known CCD image sensor (imaging device) or a CMOS image sensor (imaging device) 201 as well as a signal processing circuit 202 having a built-in amplifier and A/D converting unit, and other components. When the image sensor 201 captures an image, the amplifier and the A/D converting unit amplify analog signals expressing the luminance of the respective pixels of the image with a predetermined gain, and convert the amplified analog values into digital values expressed by the first number of gradations (12 bits herein). Thus, the camera 20 outputs output pixel values that are signals converted into these digital values (corresponding to "first display value"), as 12 bit-image data (data string which is formed of the output pixel values).

More specifically, the imager used as the imager 20A of the present embodiment has high dynamic range (HDR) characteristics of expanding the dynamic range. The HDR characteristics correspond to (nonlinear) characteristics in which the relationship of output pixel value to luminance is different depending on each luminance range, instead of being constant (linear) in all luminance ranges.

Figure 2:
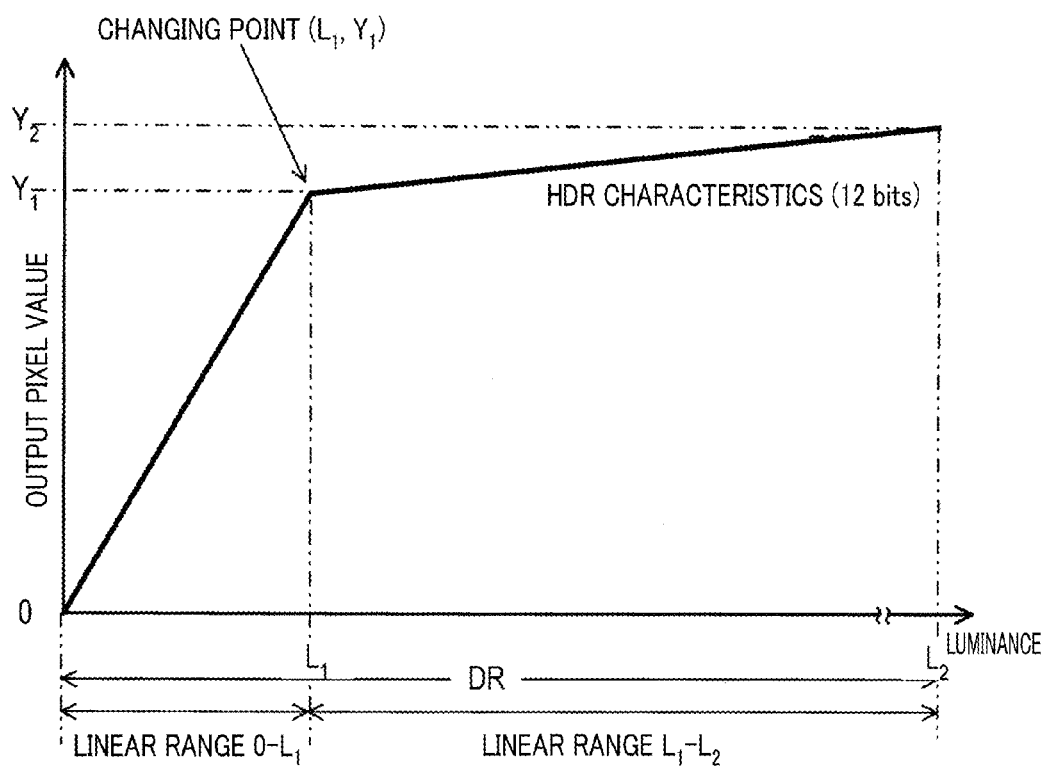
FIG. 2 is a characteristic diagram illustrating an HDR characteristic of a camera.

Specifically, as illustrated in FIG. 2, the HDR characteristics exhibit a polygonal line relationship in which the slope of a range of luminance values 0 to $L_1$ (in the following, referred to as luminance range 0 to $L_1$) is different from that of the remaining luminance ranges (luminance range $L_1$ to $L_2$). Herein, the nonlinear characteristics also include such a polygonal line relationship, i.e., a combination of linear characteristics that are different depending on each luminance range. As described above, the imager 20A is enabled to make an output in a wide luminance range, while providing a finer resolution in a low luminance range.

The relationships of an output pixel value Y to a luminance L in the luminance ranges 0 to $L_1$ and $L_1$ to $L_2$ are expressed by Equation 1 and Equation 2, respectively.

[Math. 1]

$$Y=f_1(L) \ (0 \le L \le L_1) \quad (1)$$

[Math. 2]

$$Y=f_2(L) \ (L_1 < L \le L_2) \quad (2)$$

Output pixel values $Y_0$ to $Y_2$ corresponding to the luminance values 0 to $L_2$, respectively, are each expressed by a power of two. An output pixel value $Y_2$ ($=f_2(L_2)$), which is the maximum value, is 212. The luminance value $L_1$ at a changing point ($L_1$, $Y_1$ ($=f_1(L_1)$)), at which the linear characteristics are changed, is referred to as a changing point luminance value $L_1$. In the following, when HDR characteristics are referred to, the relationship between luminance L and output pixel value Y illustrated in FIG. 2 is referred to, unless otherwise specified. The relationship between luminance L and output pixel value Y illustrated in FIG. 2 is only an example.

Referring to FIG. 1 again, the image processing apparatus 10 has a main component, a microcomputer, including a CPU 12, a ROM 13, a RAM 14, a flash memory, not illustrated, and other components. Although not illustrated in FIG. 1, the image processing apparatus 10 includes interface circuits that receive or output various signals (e.g. an input circuit that receives image data from the camera 20, an output circuit that outputs a detected result to the vehicle controller 40, and other circuits). The image processing apparatus 10 is configured to process 8-bit data.

When the CPU 12 performs a control program stored on the ROM 13 or flash memory, the image processing apparatus 10 performs, at least, a compression process of compressing 12 bit-image data inputted from the camera 20 to 8-bit image data and outputting the 8-bit image data as compressed data, and a recognition target detection process of detecting a recognition target from an image expressed by the compressed data. The detected result is outputted to the vehicle controller 40.

The vehicle controller 40 performs driver assistance control. Herein, the vehicle controller 40 is configured to execute lane keeping control, as an application, to instruct the warning unit 41 to emit an alarm. Such an instruction is given when the vehicle controller 40 determines that the own vehicle has a risk of departing from the lane, according to the detected result (position of the white line) inputted from the image processing apparatus 10.

Referring to a flowchart of FIG. 3, hereinafter will be described processes cyclically executed by the CPU 12 in accordance with a prestored program.

When processing is started, at step S110, the CPU 12 first reads output pixel values (image data) stored on the RAM 14 inputted from the camera 20. Subsequently, at step S120, the CPU 12 performs the compression process of reading compression characteristics prestored in the ROM 13, compressing the output pixel values from 12 bits to 8 bits in accordance with the compression characteristics, and outputting the compressed output pixel values as compressed pixel values corresponding to "second display value".

Subsequently, at step S130, the CPU 12 performs the recognition target detection process of detecting a recognition target (white line) from an image expressed by compressed data that is a data string formed of the 8-bit compressed pixel values. At step S140, the CPU 12 outputs the detected result (position of the white line) to the vehicle controller 40, and terminates the process. Since various methods are known for detecting a recognition target in a recognition target detection process, description is omitted.

The compression characteristics are stored on the ROM 13 as a conversion table showing output pixel values expressed by 12 bits and the corresponding compressed pixel values expressed by 8 bits. Herein, characteristics which are combination of the compression characteristics with the conversion characteristics are referred to as total conversion characteristics. A ratio of 8 bits, which is the number of gradations (or the number of steps of a gradation scale) expressing a compressed pixel value (corresponding to "second number of gradations"), to 12 bits, which is the number of gradations expressing an output pixel value (corresponding to "first number of gradations") is referred to as a basic compression ratio ($2^{-4}$ herein). A luminance range in which it is estimated that a recognition target is present is referred to as a recognition target range.

The luminance range including at least a recognition target range is referred to as a specified range. An output pixel value corresponding to a boundary luminance value, which is in the specified range, is referred to as a boundary first display value.

The conversion table (compression characteristics) is set in such a manner that in the specified range, a compressed pixel value is a sum of a low compressed value and a boundary first display value. In this case, the low compressed value is obtained by compressing a value of not less than the boundary first display value among the output pixel values, with a low compression ratio $\beta$ lower than the basic compression ratio.

Figure 4:
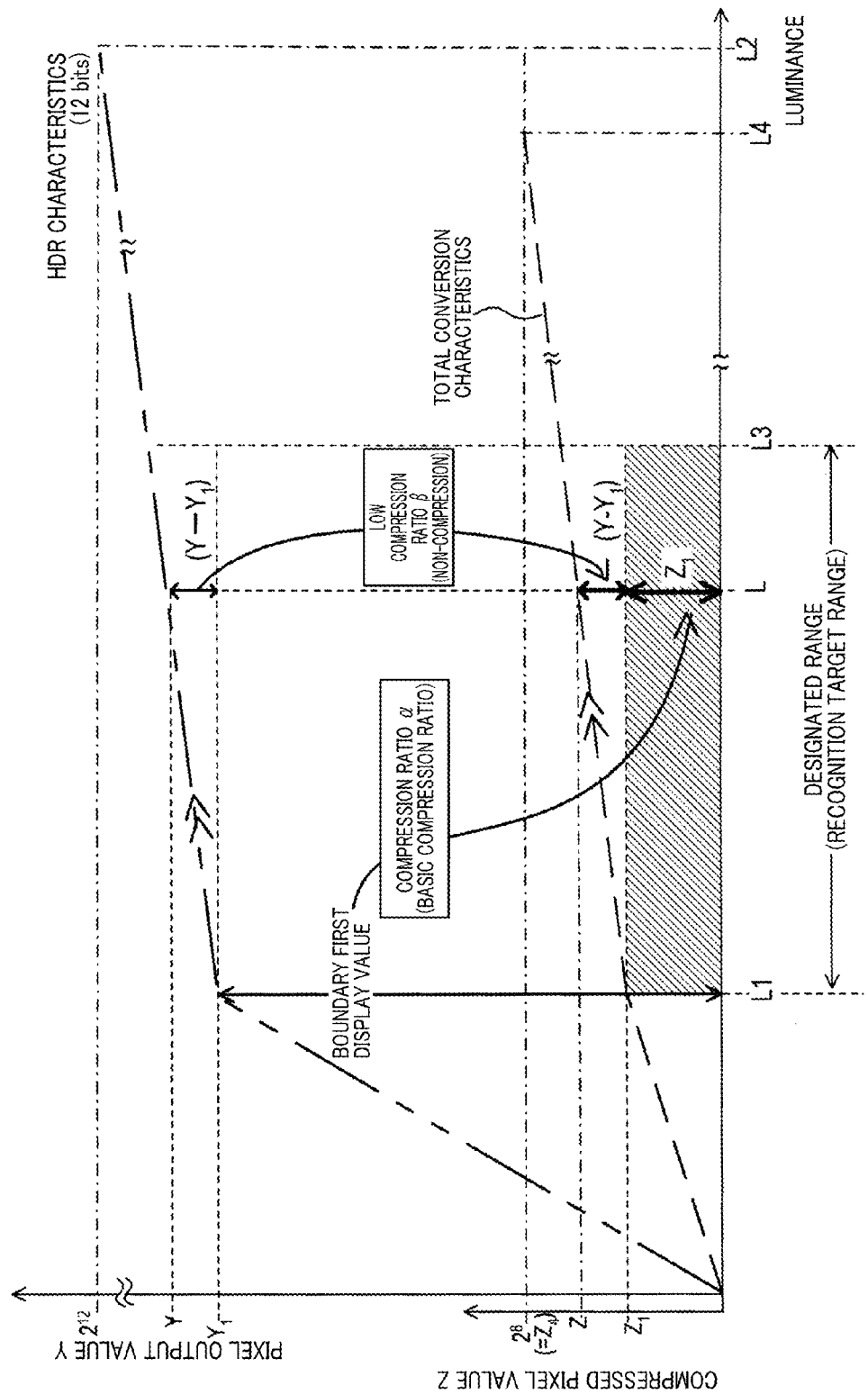
FIG. 4 is a diagram illustrating total conversion characteristics.

More specifically, as illustrated in FIG. 4, the recognition target range is set to the luminance range $L_1$ to $L_3$ where a white line as a recognition target is estimated to be present. The specified range is set in such a manner that the boundary luminance value is a minimum luminance value of a luminance range including the specified range. In other words, in the present embodiment, the specified range is set to coincide with the recognition target range. The boundary first display value is set to the output pixel value $Y_1$ corresponding to the boundary luminance value $L_1$.

The conversion table is set in such a manner that, in the luminance range 0 to $L_1$, a value obtained by compressing the output pixel value with the compression ratio $\alpha$ (herein, $\alpha$ is $1/2^4$, which is the basic compression ratio) takes a compressed pixel value Z, as expressed by Equation 3. The boundary first display value $Y_1$ is converted into a compressed value $Z_1$ through the conversion table (see Equation 4). In the following, the compressed value ($Z_1$) corresponding to the boundary first display value ($Y_1$) is referred to as a compressed basic value $Z_1$.

[Math. 3]

$$Z = \alpha \times Y = \alpha \times f_1(L) \quad (0 \le L \le L_1) \tag{3}$$

[Math. 4]

$$Z_1 = \alpha \times Y_1 = \alpha \times f_1(L_1) \tag{4}$$

As expressed by Equation 5, the conversion table is set in such a manner that at least in the specified range of $L_1$ to $L_3$, a sum of the compressed basic value $Z_1$ and another value will be the compressed pixel value Z. In this case, another value is obtained by compressing a difference between the output pixel value Y and the boundary first display value $Y_1$ at the low compressed rate $\beta$

[Math. 5]

$$\begin{aligned}Z &= Z_1 + \beta \times (Y - Y_1) \\ &= Z_1 + \beta \times (f_2(L) - Y_1) \quad (L_1 < L \le L_3)\end{aligned} \tag{5}$$

In the present embodiment, the low compression ratio $\beta$ is set to one. The compression in which the low compression ratio $\beta$ is set to one in this manner is referred to as non-compression. In other words, in non-compression, the conversion table is set in such a manner that in the specified range, the change rate of the compressed pixel value Z to the luminance value L (post-compression change rate) is similar to the change rate of the output pixel value Y to the luminance value L (pre-compression change rate) through the conversion in accordance with the total conversion characteristics.

In the present embodiment, the conversion table is set in such a manner that, for the luminance value L (L>$L_3$) greater than the specified range as well, the output pixel value Y is converted into the compressed pixel value Z according to Equation 5. Thus, a compressed pixel value $Z_4$ (=$Z_1+\beta\times(Y-Y_4)$) is ensured to be $2^8$ at the luminance value $L_4$ ($L_4<L_2$).

As described above, in the image processing apparatus 10 according to the present embodiment, in the case where the output pixel value expressed by the first number of gradations (12 bits) is compressed to the compressed pixel value expressed by the second number of gradations (eight bits), which is smaller than the first number of gradations, the conversion table used for compression is set in such a manner that a value exceeding the first display value in the output pixel values is compressed at the compression ratio β lower than the basic compression ratio, and the compressed value serves as a compressed pixel value. In the conversion table in this case, a value obtained by equally compressing the output pixel values at the basic compression ratio is not set to a compressed pixel value. More specifically, in the present embodiment, the conversion table is provided for non-compression.

Figure 5:
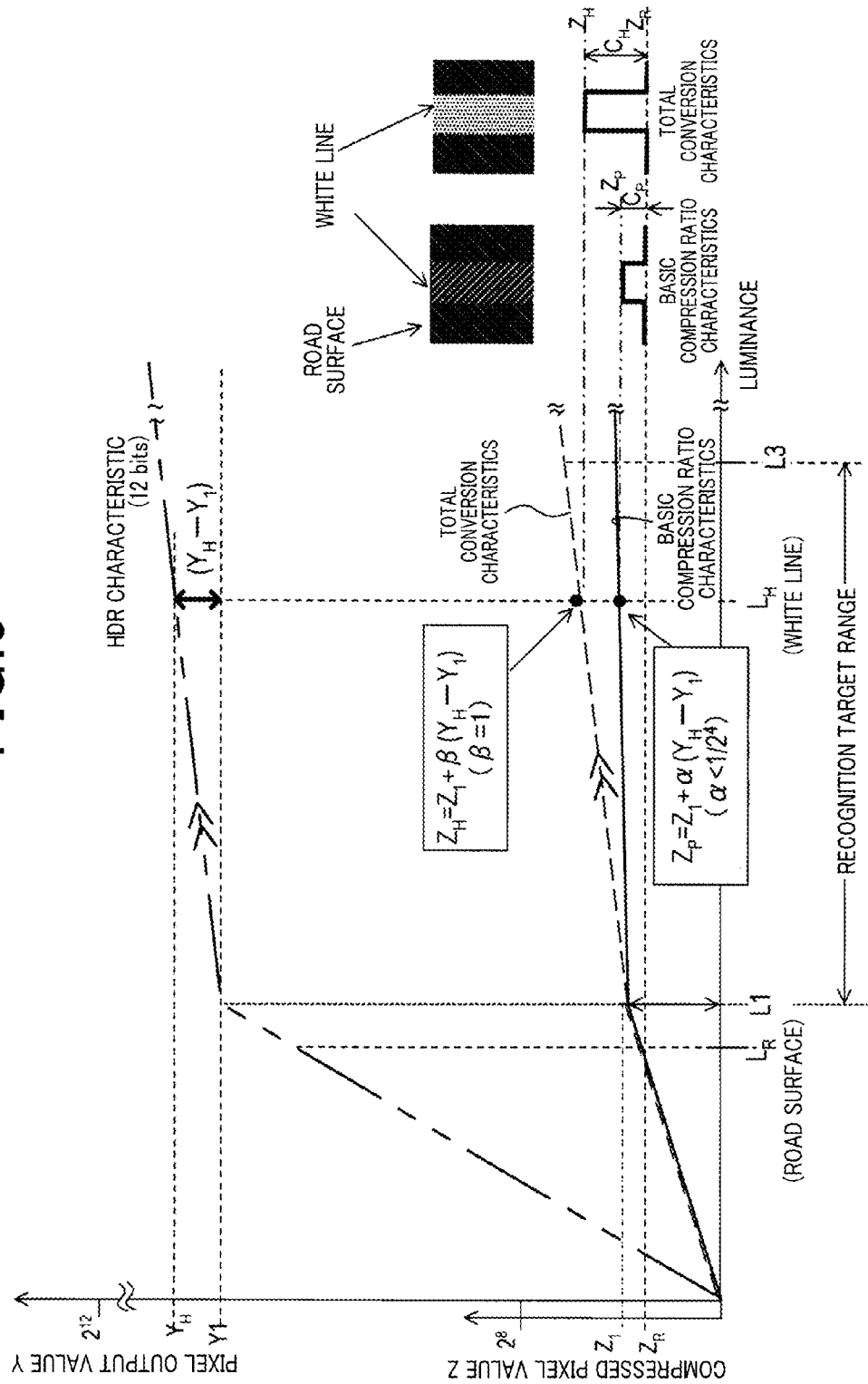
FIG. 5 is a diagram illustrating differences between the detected result of a white line in accordance with the total conversion characteristics using an image processing apparatus according to a first embodiment and the detected result of a white line obtained by uniformly compressing pixel output values at a basic compression ratio.

Here, referring to FIG. 5, detection of a recognition target (white line) performed by the image processing apparatus 10 will be described by way of an example. In FIG. 5, the total conversion characteristics are depicted by dotted lines. In FIG. 5, for comparison, a solid line depicts characteristics (referred to as basic compression ratio characteristics) of equally compressing pixel output values at the basic compression ratio.

When a value representing a luminance value indicating a road surface is taken as $L_R$, and a value representing a luminance value indicating a white line is taken as $L_H$, a contrast value $C_H$ is expressed by Equation (6). In this case contrast value $C_H$ is a difference between a compressed pixel value $Z_R$ corresponding to the road surface luminance $L_R$ obtained according to the total conversion characteristics and a compressed pixel value $Z_H$ corresponding to the white line luminance $L_H$.

[Math. 6]

$$C_H = Z_H - Z_R \\ = Z_1 + \beta \times (Y_H - Y_1) - Z_r \quad (\beta = 1)$$

(6)

On the other hand, a contrast value $C_P$ obtained according to the basic compression ratio characteristics is expressed by Equation (7).

[Math. 7]

$$C_P = Z_P - Z_R \\ = Z_1 + \alpha \times (Y_H - Y_1) - Z_R$$

(7)

In other words, as apparent from Equations (6) and (7) and FIG. 5, a greater contrast value $C_H$ can be obtained according to the total conversion characteristics.

As described above, in the image processing apparatus 10, a gray scale difference is ensured when the pixel output value is compressed to the compressed pixel value (gray scale conversion) as well, thereby minimizing lowering in the resolution of the recognition target range. Therefore, in the image processing apparatus 10, an image with clearer contrast of the white line to the road surface can be obtained ((b) of FIG. 6), as compared with the case of using the basic compression ratio characteristics (see (a) of FIG. 6). Accordingly, in an image expressed by the compressed pixel values after compression, degradation in the detection accuracy of the recognition target can be minimized.

Figure 7:
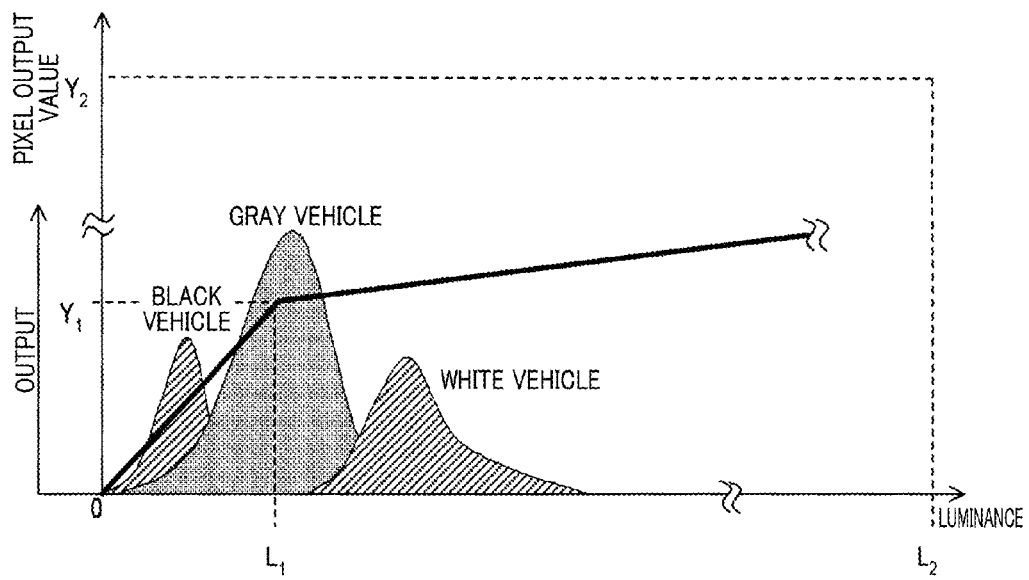
FIG. 7 is a diagram depicting the luminance distributions of a black vehicle, gray vehicle, and white vehicle when a recognition target is a vehicle.

FIG. 7 is a diagram illustrating an example of luminance distributions of a black vehicle, gray vehicle, and white vehicle and the HDR characteristics. Let us suppose herein that the output pixel values are equally compressed at the basic compression ratio. For a target including the changing point of the HDR characteristics in the range of the luminance distribution, i.e., the gray vehicle illustrated in FIG. 7, no gray scale difference appears at the luminance value L near the changing point luminance value $L_1$, but the resolution is degraded and the contrast to the road surface is lowered. As a result, the detection accuracy of the gray vehicle is lowered as compared with the black and white vehicles.

On the other hand, according to the image processing apparatus 10, the compressed pixel value has a gray scale difference relative to the luminance value L near the changing point luminance value $L_1$, and lowering of the resolution is minimized, as compared with the case where the output pixel values are equally compressed at the basic compression ratio. Therefore, for the gray vehicle, lowering of contrast relative to the road surface is minimized. As a result, in the image processing apparatus 10, lowering in the detection accuracy of the gray vehicle can be minimized.

In the present embodiment, in order to perform a white line recognition process, the conversion table (compression characteristics) is set so as to minimize lowering of resolution in the luminance range where a white line is estimated to be present. On the other hand, for example, when a pedestrian recognition process is performed, the compression characteristics may only have to be set in such a manner that lowering of resolution is minimized (i.e., clearer contrast of a pedestrian relative to the road surface is provided) in a recognition target range, taking a recognition target as a pedestrian. In this way, setting the compression characteristics according to applications, lowering in the detection accuracy of a recognition target can be minimized.

In the above embodiment, the process at step S110 corresponds to an acquiring means. The process at step S120 corresponds to a compressing means. The process at step S130 corresponds to a recognizing means.

[Modification 1]

In the above embodiment, in the compression characteristics, the low compression ratio β is set to one. Setting of the low compression ratio β should not be limited to this. The low compression ratio β only has to be set to a compression ratio lower than the basic compression ratio. In this case (β≠1), a luminance value Le when the compressed pixel value Z is $2^8$ satisfies a relationship Le>$L_4$. Thus, the dynamic range can be expanded.

In the above embodiment, in the compression characteristics, the low compression ratio β similar to the specified range is also set in the luminance range greater than the specified range. However, setting of a compression ratio is not limited to this. For the luminance range greater than the specified range, a compression ratio different from the low compression ratio β, or higher than the low compression ratio β, may be set. Thus, the contrast of the white line relative to the road surface can be made clear, and the dynamic range can be expanded.

In the above embodiment, the compression ratio α is set to the basic compression ratio. However, setting of the compression ratio α is not limited to this. The compression ratio α may be set to a compressed value higher than the basic compression ratio.

[Modification 2]

The compression characteristics may be set as follows when the recognition target range includes the changing point of the HDR characteristics luminance value $L_1$ (e.g. as illustrated in FIG. 7, when a recognition target is a gray vehicle with respect to the HDR characteristic). Specifically, in the setting, a relationship of the compressed pixel value with the luminance value may be permitted to be linear in the specified range by conversion according to the total conversion characteristics.

Figure 8:
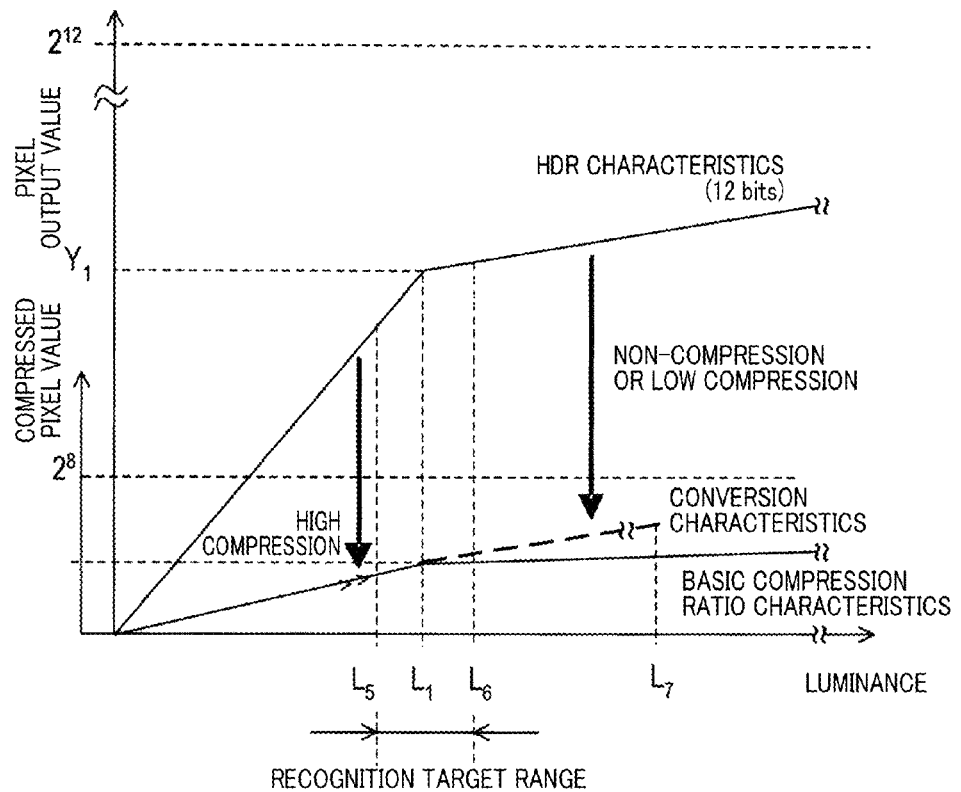
FIG. 8 is a diagram depicting the total conversion characteristics of a modification.

Specifically, as illustrated in FIG. 8, the compression characteristics may be set in such a manner that when the luminance range (recognition target range) of the gray vehicle covers luminance values $L_5$ to $L_6$, the luminance range of $L_5$ to $L_6$ may be taken as a specified range, and the relationship of the compressed pixel value with the luminance value may be permitted to be linear in the specified range.

Thus, at least in the specified range of $L_5$ to $L_6$, the compressed pixel value will have a gray scale difference by conversion based on the total conversion characteristics. Accordingly, the detection accuracy of the recognition target (detection accuracy of the gray vehicle in FIG. 7) can be improved.

[Modification 3]

Figure 9:
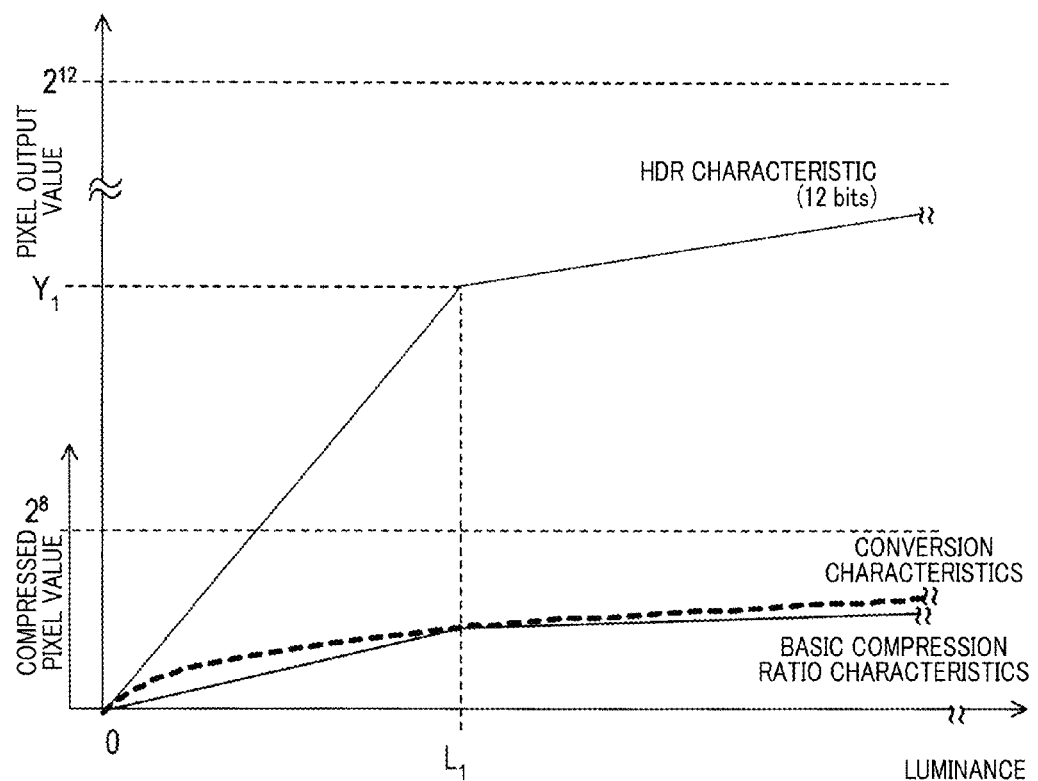
FIG. 9 is a diagram depicting the total conversion characteristics of another modification.

The compression characteristic may be set in such a manner that the relationship between the compressed pixel value obtained by conversion based on the total conversion characteristics and the luminance value is expressed by a logarithm (see FIG. 9).

[Modification 4]

In the above embodiment, the specified range is set in such a mane that the boundary luminance value coincides with the changing point luminance value. Alternatively, the specified range may be set in such a manner that the boundary luminance value does not coincide with the changing point luminance value. The specified range does not necessarily have to coincide with the recognition target range as in the above embodiment, but may only have to be set to a range including at least a recognition target range.

Second Embodiment

Next, a second embodiment will be described. In the description of this present embodiment, components identical with or equivalent to the components configuring the system of the first embodiment described above are designated with the same reference numerals and signs, and the description is omitted or simplified.

Figure 10:
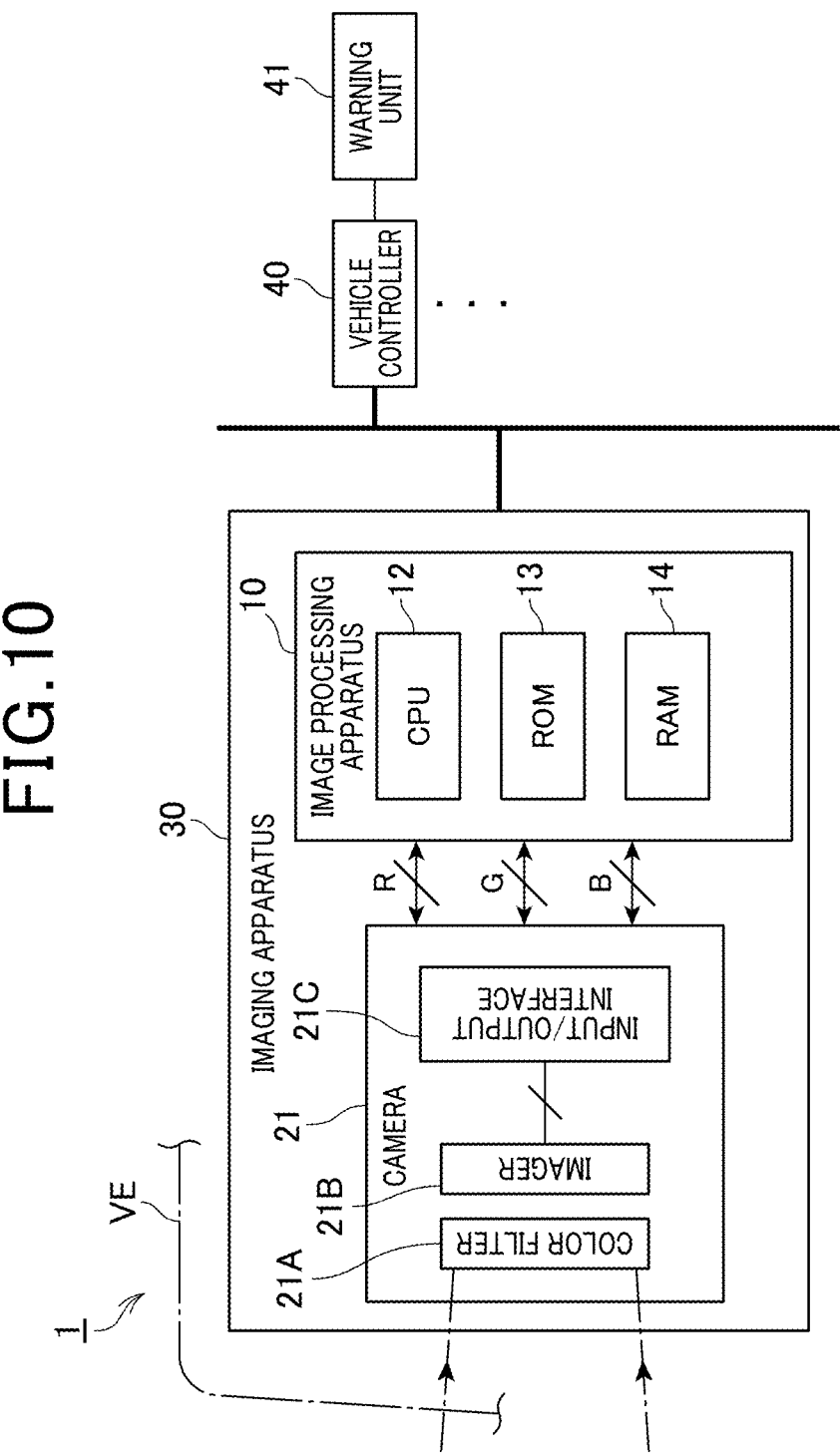
FIG. 10 is a block diagram illustrating a configuration of a driver assistance system according to a second embodiment.

The present invention is also applicable to an imaging apparatus configured to capture color images. As illustrated in FIG. 10, a driver assistance system 2 according to the present embodiment is installed on a vehicle VE, and realizes automatic high beam control. For example, the driver assistance system 2 detects, as a recognition target, a (red) taillight of a preceding vehicle which is present in the forward area of the vehicle (the own vehicle) VE. When there is a preceding vehicle, the headlight of the own vehicle is caused to emit a low beam, and when there is no preceding vehicle, the headlight is caused to emit a high beam.

As compared with the foregoing embodiment, an image processing apparatus 11 according to the present embodiment is different in that image data outputted from a camera 21 (imaging means) is formed of a plurality of image data segments expressing a color image, i.e., image data segments corresponding to three channels of R (red), G (green), and B (blue). Accompanying this, processes executed by a CPU 12 are partially different from those of the foregoing embodiment.

Figure 11:
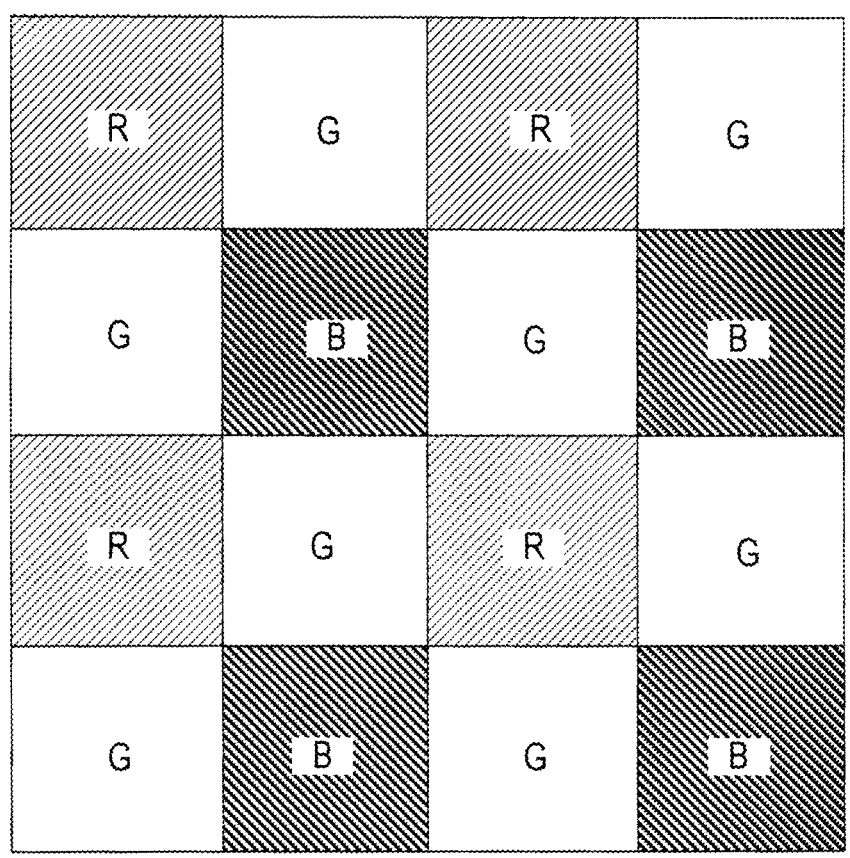
FIG. 11 is a diagram depicting a pixel array of an imager.

Unlike the camera 20 according to the foregoing embodiment, the camera 21 includes a color filter 21A, an imager 21B, and an input/output interface circuit 21C disposed in this order from the front side of the camera 21. Thus, external light enters the imager 21B through the color filter 21A. The color filter 21A may be integrally provided on the front face of the imager 21B, or may be separately disposed on the front face of the imager 21B. As illustrated in FIG. 11, this color filter 21A is configured in accordance with a Bayer array including a pixel to selectively detect R (red) light, a pixel to selectively detect G (green) light, and a pixel to selectively detect B (blue) light. The color of a given pixel is determined on the basis of the detected results (pixel output values) of a plurality of pixels adjacent to the given pixel.

Particularly, the imager 21B outputs image data of three channels of R (red), G (green), and B (blue) for each of pixels (data string formed of 12-bit pixel output values). Similar to the foregoing embodiment, the imager used in the present embodiment has HDR characteristics. In the following, for simplifying explanation, the imager has characteristics similar to the HDR characteristics illustrated in FIG. 2.

Figure 3:
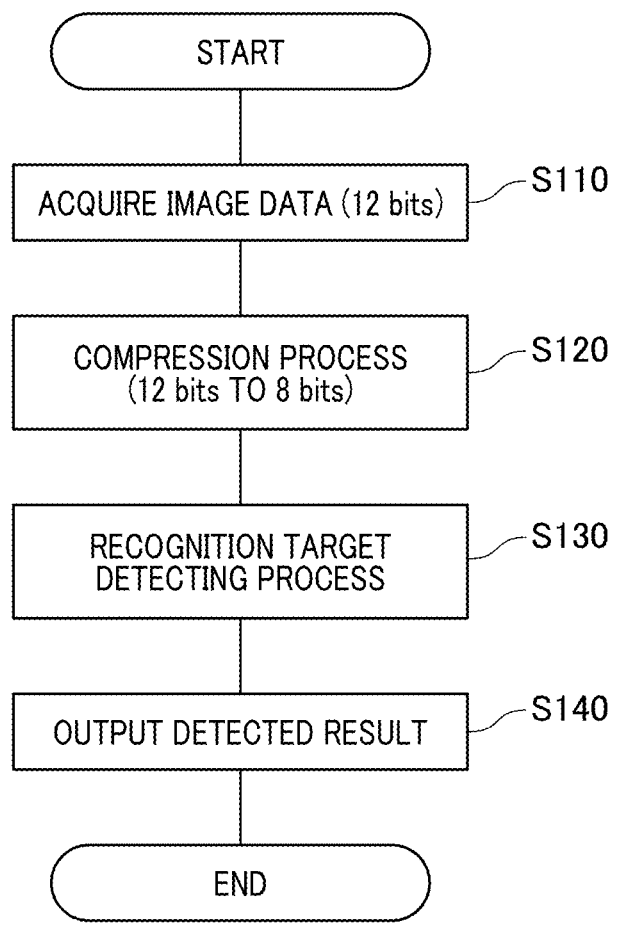
FIG. 3 is a flowchart illustrating processes performed by a CPU.

The CPU 12 performs processes similar to those in the flowchart illustrated in FIG. 3 described above. However, the present embodiment is different from the foregoing embodiment in that image data targeted for processing is of three channels of R (red), G (green), and B (blue).

In other words, in the present embodiment, the CPU 12 reads image data of three channels of R, G, and B at step S110 illustrated in FIG. 3. Subsequently, at step S120, the CPU 12 compresses 12-bit pixel output values of three channels of R, G, and B to 8-bit compressed pixel values for each of the pixels in accordance with compression characteristics (conversion table) stored on a ROM 13, and outputs compressed pixel values of three channels of R, G, and B. Subsequently, at step S130, the CPU 12 detects the red taillight of a preceding vehicle as a recognition target, from an image expressed by compressed data that is a data string formed of the compressed pixel values corresponding to three channels of R, G, and B.

Figure 12:
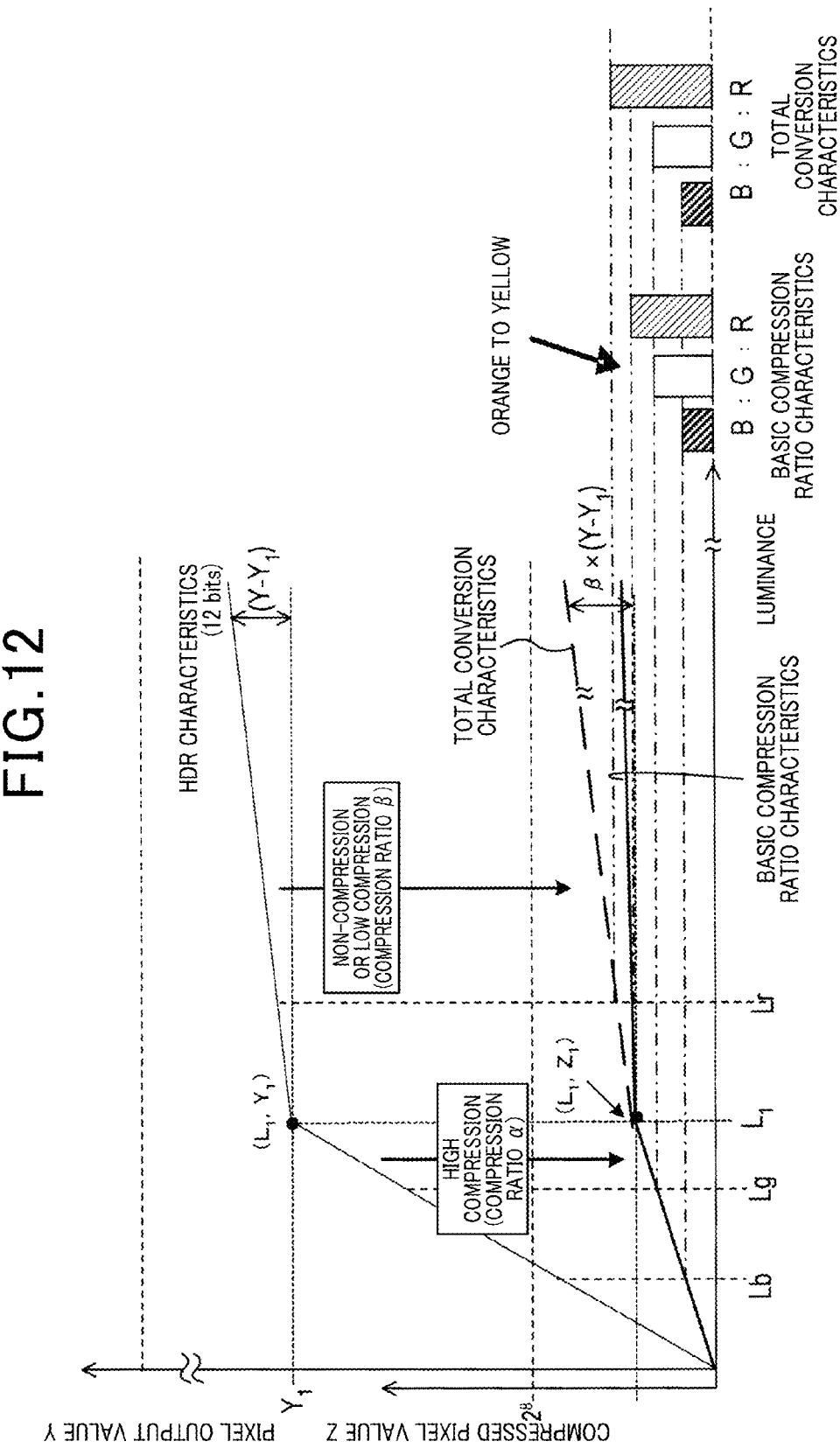
FIG. 12 is a diagram illustrating differences between the detected result in accordance with the total conversion characteristics of an image processing apparatus according to the second embodiment and the detected result obtained by uniformly compressing pixel output values at a basic compression ratio.

FIG. 12 depicts a component ratio of R, G, and B compressed data (compressed pixel values), and for comparison, a component ratio of R, G, and B image data. In the R, G, and B compressed data, pixel output values, which correspond to a luminance value Lb representing B (blue), a luminance value Lg representing G (green), and a luminance value $L_R$ representing R (red), are compressed by the image processing apparatus 11. In the R, G, and B image data for comparison, the pixel output values are compressed according to the basic compression ratio characteristics (see the description of the foregoing embodiment).

In the compression according to the basic compression ratio characteristics, since no gray scale difference is available for R image data, the ratio of the R image data lowers in the component ratio of the R, G, and B image data. Therefore, there is a concern that the R image data is erroneously recognized as being a color in a range of orange to yellow, instead of being recognized as a red color.

On the contrary, in the compression by the image processing apparatus 11, since R compressed data has a gray scale difference, a ratio of lowering of the R compressed data is minimized in the component ratio of the R, G, and B compressed data. Thus, the R image data can be recognized as a red color.

Thus, in the image processing apparatus 11 according to the present embodiment, erroneous recognition of colors can be minimized when R, G, and B image data expressed by the first number of gradations (12 bits) is compressed to R, G, and B image data expressed by the second number of gradations (8 bits) smaller than the first number of gradations. As a result, the accuracy of detecting a taillight is improved. Accordingly, highly accurate automatic high beam control can be realized.

In the present embodiment, the conversion table is set in such a manner that the relationship of a compressed pixel value with a luminance value is linear in each of luminance ranges, the compressed pixel value being converted according to the total conversion characteristics. Alternative to this, the conversion table may be set in such a manner that the relationship of a compressed pixel value with a luminance value is expressed by a logarithm, compressed pixel value being converted according to the total conversion characteristics (see FIG. 9). According to this setting, no point (changing point) is present, at which the compressed pixel value suddenly changes relative to the luminance. Accordingly, the accuracy of detecting colors can be improved.

Other Embodiments (1) In the foregoing embodiments, the image processing apparatus 10 or 11 is configured to convert the pixel output value into the compressed pixel value at step S120 using the conversion table. However, the configuration is not limited to this. The image processing apparatus 10 or 11 may be configured to convert the pixel output value into the compressed pixel value at step S120 using a mathematical expression, such as a linear expression or quadratic expression.

(2) In the present embodiments, the HDR characteristics are set so as to make the resolution finer in a low luminance range. However, the HDR characteristics may be set so as to make the resolution finer in a high luminance range. In the foregoing embodiments, the HDR characteristics are set so as to have one changing point. However, the HDR characteristics may be set so as to have a plurality of changing points.

(3) In the foregoing embodiments, the driver assistance system is configured to perform lane keeping control and automatic high beam control as applications. However, applications are not limited to these. The driver assistance apparatus may be configured to perform various driver assistance controls as applications, including inter-vehicle distance control in which the vehicle controller detects a preceding vehicle as a recognition target, for example, and keeps a distance to the detected preceding vehicle, follow-up control in which the vehicle controller causes the vehicle to follow a preceding vehicle, or avoidance control in which the vehicle controller detects a pedestrian as a recognition target and controls the vehicle to avoid the detected pedestrian.

(4) In the foregoing embodiments, the image processing apparatus is applied to the driver assistance system which is installed in a vehicle. However, the applicable range is not limited to this. The present invention is applicable to various imaging apparatuses that capture an image of a recognition target, and systems provided with these imaging apparatuses.

(5) The components of the image processing apparatus exemplified in the foregoing embodiments may be realized with hardware or software, or may be realized with a combination of hardware and software. For example, at least a part of the image processing apparatus may be configured by a computer device (e.g. microcomputer) that executes the processes (programs) described above. These components are functional conceptions. A part or all the components may be functionally or physically distributed or integrated.

(6) The foregoing embodiments are merely examples of embodiments to which the present invention is applied. The present invention can be achieved in various modes including programs to cause a computer to function as an image processing apparatus, an image processing method, and an image processing apparatus, and recording media on which the programs are recorded.

REFERENCE SIGNS LIST 1, 2 . . . Driver assistance system
10, 11 . . . Image processing apparatus
20, 21 . . . Camera (imaging means)
20A, 21B . . . Imager (imaging device)
30, 31 . . . Imaging apparatus
40, 42 . . . Vehicle controller

The invention claimed is:

1. An image processing apparatus comprising:
an acquiring means for converting a luminance value in accordance with preset nonlinear conversion characteristics and acquiring, from an imaging device, image data that is a data string formed of a first display value expressed by a first number of gradations;
a compressing means for compressing the first display value in accordance with preset compression characteristics and outputting, as a second display value, a value expressed by a second number of gradations smaller than the first number of gradations; and
a recognizing means for detecting a recognition target from an image expressed by compressed data that is a data string formed of the second display value, wherein:
a ratio of the second number of gradations to the first number of gradations is set as a basic compression ratio, a luminance range including at least a recognition target range that is a luminance range where the recognition target is estimated to be present is set as a specified range, and the first display value corresponding to a boundary luminance value that is a minimum luminance value in the specified range is set as a boundary first display value;
the conversion characteristics are set as a combination of linear characteristics that are predetermined for each luminance range;
the specified range is set such that the recognition target range includes a changing point luminance value, the changing point luminance value being a luminance value at a changing point of the linear characteristics, the linear characteristics being changed at the changing point in accordance with the conversion characteristics;
the compression characteristics are set such that the second display value is a sum of a compressed value and the boundary first display value in the recognition target range, the compressed value being obtained by compressing a value of not less than the boundary first display value among the first display values at a low compression ratio lower than the basic compression ratio; and
the compression characteristics are set such that, at least, in the specified range, a relationship of the second display value converted in accordance with total conversion characteristics to the luminance value becomes linear, the total conversion characteristics being set as a combination of the compression characteristics and the conversion characteristics.

2. The image processing apparatus according to claim 1, wherein the compression characteristics are set so that the low compression ratio is one in the specified range.

3. An image processing method comprising:

an acquiring step of converting a luminance value in accordance with preset nonlinear conversion characteristics and acquiring, from an imaging device, image data that is a data string formed of a first display value expressed by a first number of gradations;

a compressing step of compressing the first display value in accordance with preset compression characteristics and outputting, as a second display value, a value expressed by a second number of gradations smaller than the first number of gradations; and a recognizing step of detecting a recognition target from an image expressed by compressed data that is a data string formed of the second display value, wherein:

a ratio of the second number of gradations to the first number of gradations is set as a basic compression ratio, a luminance range including at least a recognition target range that is a luminance range where the recognition target is estimated to be present is set as a specified range, and the first display value corresponding to a boundary luminance value that is a minimum luminance value in the specified range is set as a boundary first display value;

the conversion characteristics are set as a combination of linear characteristics that are predetermined for each luminance range;

the specified range is set such that the recognition target range includes a changing point luminance value, the changing point luminance value being a luminance value at a changing point of the linear characteristics, the linear characteristics being changed at the changing point in accordance with the conversion characteristics;

the compression characteristics are set such that the second display value is a sum of a compressed value and the boundary first display value in the recognition target range, the compressed value being obtained by compressing a value of not less than the boundary first display value among the first display values at a low compression ratio lower than the basic compression ratio; and the compression characteristics are set such that, at least, in the specified range, a relationship of the second display value converted in accordance with total conversion characteristics to the luminance value becomes linear, the total conversion characteristics being set as a combination of the compression characteristics and the conversion characteristics.

* * * * *